Figure 1:
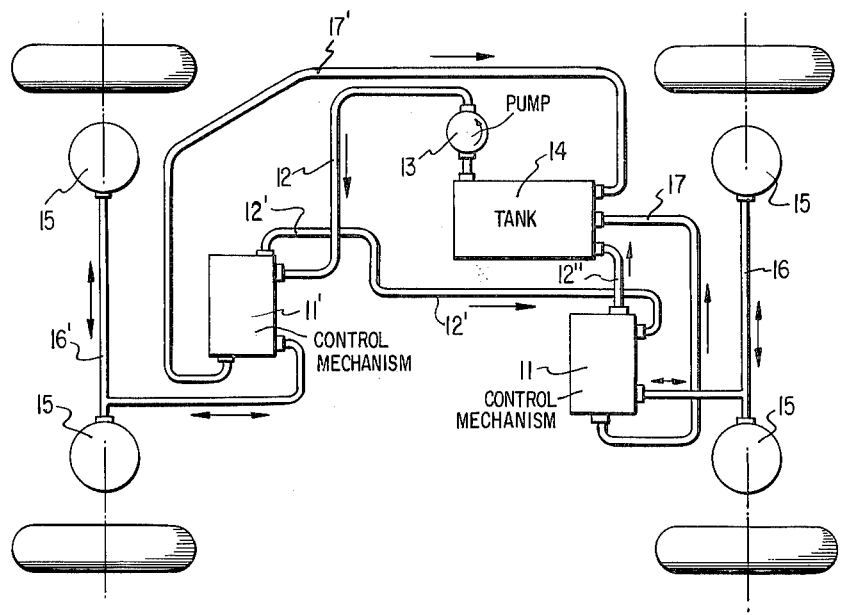

INVENTOR.
UDO SAFTIEN

United States Patent Office 3,237,958
Patented Mar. 1, 1966

3,237,958
AUTOMATIC CONTROL MECHANISM FOR A HYDRAULIC PRESSURE SYSTEM IN MOTOR VEHICLES
Udo Saftien, Waiblingen, Germany, assignor to Daimler-Benz Aktiengesellschaft, Stuttgart-Unterturkheim, Germany
Filed Mar. 18, 1964, Ser. No. 352,805
Claims priority, application Germany, Mar. 23, 1963, D 41,205
17 Claims. (Cl. 280—6.1)

The present invention relates to an automatic regulating system for maintaining constant the height of the vehicle body of motor vehicles, especially passenger motor vehicles, which is supported with respect to the wheel suspension by oil-air spring elements, and in which these spring elements are connected by way of a control installation with a hydraulic circulatory system which includes a supply pump for maintaining a continuous oil flow which flows through the respective control installations coordinated to the individual vehicle axles; the oil flow or oil stream flowing through the control installations is thereby temporarily blocked by a control valve during the regulating operation to be referred to hereinafter as the control condition "Filling the Spring Elements With Pressure Oil" and is eventually valved or shifted over to the spring elements by means of a pressure relief valve automatically opening in the direction toward the spring elements by the increasing pump pressure resulting from the temporary blockage, whereby transmission members are actuated in dependence on the prevailing distance of the vehicle body from the respective wheel axle which, in turn, actuate valves that assist the control of the regulating operations to be referred to hereinafter as "Supply of Pressure Oil to or Discharge of Pressure Oil out of the Spring Elements."

Control installations which are constructed according to the aforementioned characteristics and which also operate in the manner described above, are provided—to the extent the control members which are actuated themselves in dependence on the prevailing distance of the vehicle body from the wheel axles, are utilized themselves for the actuating of the control valve—with an annular flow passage or groove through which takes place the continuous oil flow. During the operating conditions "Filling of the Spring Elements With Pressure Oil or Discharge of Pressure Oil From the Spring Elements," this annular groove is closed by axial displacement of the control valve. The disadvantage of this prior art annular groove control consists in that toward the end of the operation "Filling the Spring Elements With Pressure Oil," when the annular groove of the control valve comes to lie in front of the orifices of the connecting bores for the continuous oil flow, that is, if only a relatively narrow flow gap has been once established and the relief valve effective in the direction toward the spring elements has already closed by reason of the occurring pressure decrease so that the control valve remains stationary with respect to the annular flow groove in this semi-opened position, high flow velocities of the oil stream occur that may lead to damages, for example, due to strong heating, if this condition lasts for longer periods of time, that is, for example, during longer waiting periods while loading the vehicle.

The present invention is concerned with the problem of eliminating these disadvantages and to create a solution satisfactory for the operating conditions that may occur.

The present invention essentially consists in that the control valve of the control installation supported to be freely movable in the direction of its longitudinal axis, is provided on the end face thereof facing the continuous oil stream with an annular zone extending beyond the valve seat thereof and exposed to the pressure of the continuous oil stream also in the closed position thereof, and that furthermore closure valves are provided which close a connecting line, located on the other side of the control valve and of larger area than the aforementioned annular zone, with respect to the supply lines leading to the spring elements as well as against a return line leading back to the oil tank, these closure valves being actuated during the control operations by the transmission members actuated by the relative movements between the vehicle body and the wheel suspension members in the sense that during the regulating condition "Supply of Pressure Oil to the Spring Elements" a first closure valve, normally closing the connecting line with respect to the supply line leading to the spring elements is temporarily opened by a first transmission member, whereas the other closure valves remain closed; that in contrast thereto during the regulating condition "Discharge of Pressure Oil out of the Spring Elements" the other closure valves, namely a second closure valve normally closing the connecting line with respect to the supply line leading to the spring elements and a third closure valve normally closing the connecting line with respect to the return line leading to the tank are temporarily opened whereas the first closure valve remains closed.

It is achieved by the present invention that toward the end of the operating condition "Filling of the Spring Element With Pressure Oil" the control valve is again opened fully in an instantaneous manner in relation to the circulatory system for the continuous oil stream, and more particularly by the pressure of the continuous oil stream itself.

Accordingly, it is an object of the present invention to provide an automatic regulating installation for maintaining constant the height of the vehicle body of vehicles which obviates by simple means the aforementioned shortcomings encountered with the prior art constructions.

It is another object of the present invention to provide a regulating installation regulating the height of the body relative to the road surface which prevents damage, for instance, due to overheating and thus increases the length of life of the installation.

Another object of the present invention resides in the provision of a regulating installation of the type described hereinabove in which the control valve is automatically re-opened instantaneously by the pressure of the continuous oil stream thereby assuring reliable operation of the system.

Figure 2:
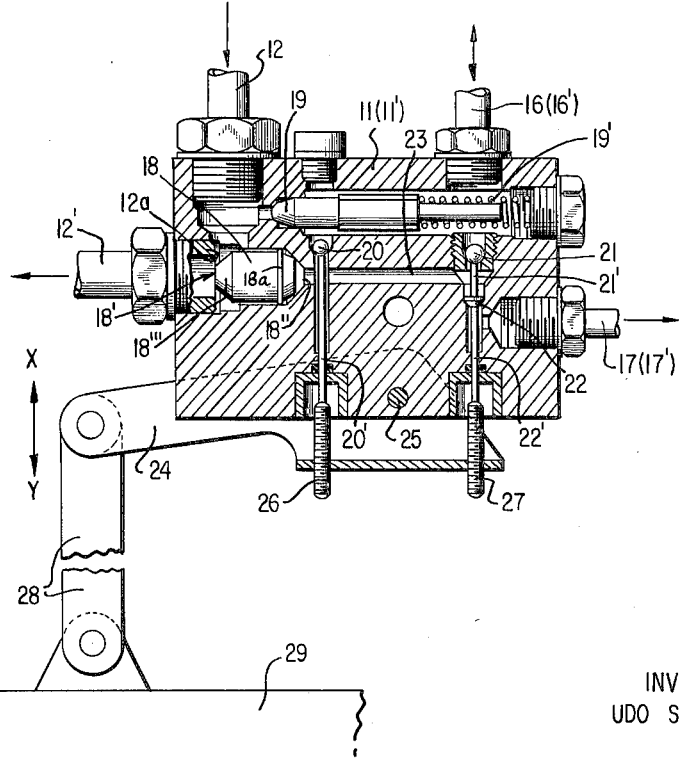

These and other objects, features, and advantages of the present invention will become more obvious from the following description when taken in connection with the accompanying drawing, which shows, for purposes of illustration only, one embodiment in accordance with the present invention, and wherein:

FIGURE 1 is a schematic plan view of a control installation for a motor vehicle in accordance with the present invention, and FIGURE 2 is a partial cross-sectional view through a control mechanism in accordance with the present invention.

Referring now to the drawing wherein like reference numerals are used throughout the two views to designate like parts, and more particularly to FIGURE 1, reference numerals 11 and 11' designate therein schematically shown control mechanisms the details of which will be described more fully hereinafter, one each being coordinated to a respective wheel axle. The two control mechanisms 11 and 11' are connected with one another by a closed pressure-oil circulatory system including line sections 12, 12', 12''. An oil pump 13 connected into the circulatory system 12, produces a continuous oil stream or flow of oil under pressure. The pump 13 draws oil out of an oil tank or reservoir 14 for eventual feed to the hydro-pneumatic spring elements 15 forming part of the vehicle spring system by way of the supply lines 16 and 16′ leading to the spring elements 15, while reference numerals 17 and 17′ designate the return lines leading from the control mechanisms 11 and 11′ back to the tank 14.

As may be seen from FIGURE 2, which illustrates the details of each control mechanism 11, 11′, mechanism 11 and 11′ comprises a main control valve 18, a pressure relief valve 19 held in the closed position by spring 19′ and three closure valves 20, 21 and 22. The main control valve 18, which is preferably made of plastic material, is arranged so as to be freely movable in the direction of its longitudinal axis. The connecting line 23 leads from the control valve 18 by way of closure valves 21 or 20 to the corresponding supply line 16 or 16′ and by way of closure valve 22 to return line 17 or 17′. A two-armed lever 24 is pivotally supported by means of a pivot pin or shaft 25 in each control installation 11 or 11′. The actuating pins 26 and 27 forming transmission members for the initiated control movements are threadably secured in the web portion of the two-armed lever 24. The actuating pins 26 and 27, in turn, actuate the push rod 20′ and push rods 21′ and 22′, respectively. A coupling member or link 28 is pivotally connected with the lever 24 near one end thereof, while the other end thereof is pivotally connected with a conventional wheel guide arm or wheel axle 29 of a wheel suspension.

*Operation*

The operation of the control installation in accordance with the present invention is as follows, it being assumed that the illustrated right-hand position of the main control valve 18 is the starting position thereof which is effected by the pressure of the continuous oil stream in the system 12 or 12′ acting on the left, conically-shaped end face 18′ of the control valve 18.

During loading of the vehicle or boarding of passengers, the lever 24 is pivoted in the direction of arrow X, as a result of the increased load in the vehicle, whereby the closure valve 20 is opened as a result of the upward movement of the plunger or push rod 20′ by the pin 26. The pressure prevailing within the hydro-pneumatic spring elements 15 of a respective vehicle axle 29 and therewith in the corresponding supply line 16 or 16′ which is considerably larger than the pressure of the continuous oil stream in the circulatory system 12, 12′ thus reaches the connecting line 23 through the now open closure valve 20 and thus acts on the right end face 18″ of the control valve 18 whereby the control valve 18 is pressed with the left end face 18′ thereof against the valve seat 12a so that the continuous oil flow produced by pump 13 and normally flowing from line 12 into line 12′ or from line 12′ into line 12″ is blocked, packing 18a provided along the outer main surfaces of the control valve 18 preventing leakage of the oil about the control valve 18 into the connecting line 23. As a result thereof, an increased pressure builds up in the line section 12 in front of or upstream of the control valve 18 by the continued operation of the pump 13 which eventually opens the pressure relief valve 19 and displaces the same toward the right against spring 19′, so that the oil under pressure in line 12 whose pressure exceeds that in the lines 16 or 16′ and springs 15, can reach the spring elements 15 by way of supply line 16 or 16′, whereupon the vehicle body is again lifted. Lifting of the vehicle body in turn produces a pivoting of the lever 24 in the direction of arrow Y, and more particularly for such length of time until the closure valve 20 again closes, whereupon the initial level of the body is re-established. By reason of a refilling of the springs 15 during a short period of time within slight limits above the theoretical value, the closure valve 22 is also opened for an instant when the lever 24 swings in the direction Y a slight distance beyond the initial predetermined position so that the pressure enclosed within the connecting line 23, once valve 20 closes again, can be relieved by way of the now open valve 22 and return line 17 or 17′. The temporary opening of closure valve 22 is realized as mentioned above by pivoting of the lever 24 in the direction of arrow Y beyond the initial position thereof whereby the actuating pin 27 actuates the push rod 22′ and 21′ thereby opening the valve 22 and possibly also valve 21 if the push rod 21′ abuts against the valve 21 with the valve 22 in the fully closed position thereof. While in this case opening of the valve 22 is a desired opening, in order to decrease the pressure in line 23, the opening of valve 21 for the relatively short period of time represents an undesirable side effect. This undesired effect can, however, be eliminated in a simple manner when the end of the push rod 21′, with the valve 22 fully closed, is spaced a slight distance from the ball member of the valve. The control valve 18 is now again displaced toward the right by the pressure prevailing within the circulatory system 12 which acts against the annular zone 18‴ projecting beyond the valve seat 12a so that the continuous oil flow is again re-established in lines 12, 12′ and 12″. In order to enable the desired operation of the alternating play between the left closing position and right open position of the control valve 18, the annular zone 18‴ must, of course, be smaller in area than the area of the right end face 18″ which is the case anyhow in the embodiment illustrated. By such relative dimensioning of the annular zone 18‴ and of the end face 18″ there is achieved that the control valve 18 remains in the left closing position during the control operation "Filling of the Spring Elements With Pressure Oil." The increased filling pressure produced by the pump 13, thereby acts both on the annular zone 18‴ and on the end face 18″ once the pressure relief valve 19 opens while valve 20 is already open.

During unloading of the vehicle or during the "Discharge of Pressure Oil From the Spring Elements" both closure valves 22 and 21 are opened due to the pivoting of the lever 24 in the direction of arrow Y so that the oil is conducted from springs 15 and lines 16 or 16′ back to the tank 14 by way of the return line 17 or 17′.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein, but intend to cover all such changes and modifications as are encompassed by the scope of the appended claims.

I claim:

1. In a motor vehicle having a vehicle body supported with respect to the wheel suspension by means of hydro-pneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system and automatically actuated by the increased pump pressure of the hydraulic medium upon actuation of said control valve means to produce the said temporary blocking, means in said housing for selectively controlling the supply of hydraulic pressure medium from said circulatory system to said spring elements and the discharge of hydraulic pressure medium from the spring elements into said tank by way of said supply and return lines, respectively, including a connecting line and a plurality of further valve means, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said other two further valve means which normally close the connecting line against the supply and return lines are temporarily opened while the first-mentioned further valve means remains closed.

2. In a motor vehicle having a vehicle body supported with respect to the wheel suspension by means of hydro-pneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system and automatically actuated by the increased pump pressure of the hydraulic medium upon actuation of said control valve means to produce the said temporary blocking, means in said housing for selectively controlling the supply of hydraulic pressure medium from said circulatory system to said spring elements and the discharge of hydraulic pressure medium from the spring elements into said tank by way of said supply and return lines, respectively, including a connecting line and a plurality of further valve means, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said other two further valve means which normally close the connecting line against the supply and return lines are temporarily opened while the first-mentioned further valve means remains closed, said annular zone being constructed of conical shape.

3. In a motor vehicle having a vehicle body supported with respect to the wheel suspension by means of hydro-pneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system and automatically actuated by the increased pump pressure of the hydraulic medium upon actuation of said control valve means to produce the said temporary blocking, means in said housing for selectively controlling the supply of hydraulic pressure medium from said circulatory system to said spring elements and the discharge of hydraulic pressure medium from the spring elements into said tank by way of said supply and return lines, respectively, including a connecting line and a plurality of further valve means, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said other two further valve means which normally close the connecting line against the supply and return lines are temporarily opened while the first-mentioned further valve means remains closed, said transmission means including a first transmission member and a push rod opening the first one of said further valve means for the supply of pressure medium to the spring elements.

4. In a motor vehicle having a vehicle body supported with respect to the wheel suspension by means of hydro-pneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system and automatically actuated by the increased pump pressure of the hydraulic medium upon actuation of said control valve means to produce the said temporary blocking, means for selectively controlling the supply of hydraulic pressure medium from said circulatory system to said spring elements and the discharge of hydraulic pressure medium from the spring elements into said tank by way of said supply and return lines, respectively, including a plurality of further valve means and a connecting line, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said two further valve means which normally close the connecting line against the supply and return lines are temporarily opened while the first-mentioned further valve means remains closed, the said two further valve means being disposed one behind the other in the actuating direction thereof, and said transmission means including a transmission member and push-rods provided on both sides of the one of said two further valve means closing the connecting line with respect to the return line for actuating both of said two further valve means substantially simultaneously by said transmission member to thereby enable the discharge of pressure medium from said spring elements.

5. In a motor vehicle having a vehicle body supported with respect to the wheel suspension by means of hydro-pneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system and automatically actuated by the increased pump pressure of the hydraulic medium upon actuation of said control valve means to produce the said temporary blocking, means in said housing for selectively controlling the supply of hydraulic pressure medium from said circulatory system to said spring elements and the discharge of hydraulic pressure medium from the spring elements into said tank by way of said supply and return lines, respectively, including a connecting line and a plurality of further valve means, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said other two further valve means which normally close the connecting line against the supply and return lines are temporarily opened while the first-mentioned further valve means remains closed, said transmission means including a first transmission member and a push rod opening the first one of said further valve means for the supply of pressure medium to the spring elements, said other further valve means being disposed one behind the other in the actuating direction thereof, and a second transmission member and push-rods provided on both sides of the further valve means closing the connecting line with respect to the return line for actuating both of the other further valve means substantially simultaneously by said second transmission member to thereby enable the discharge of pressure medium from said spring elements.

6. In a motor vehicle having a vehicle body supported with respect to the wheel suspension by means of hydropneumatic spring elements, in which the hydro-pneumatic spring elements are adapted to be supplied with hydraulic pressure medium by way of supply lines from a hydraulic circulatory pressure system including a supply pump for supplying a continuous oil stream and in which the hydraulic pressure medium is adapted to be discharged from the spring elements by way of return lines into a tank, the combination of an automatic control mechanism operatively connected with said circulatory system and with said supply and return lines for controlling the feed of hydraulic pressure medium to and the discharge thereof from said spring elements to thereby maintain substantially constant the height of the vehicle body with respect to the wheel suspension, comprising, within a housing:

control valve means interconnected in said circulatory pressure system and operable to control the flow of oil supplied by said pump in such a manner as to temporarily block the flow of oil during a regulating condition calling for the filling of the spring elements with the hydraulic pressure medium, pressure relief valve means operatively connected in said circulatory system ahead of said control valve means and automatically actuated by the increased pump pressure of the hydraulic medium upon actuation of said control valve means to produce the said temporary blocking, means in said housing for selectively controlling the supply of hydraulic pressure medium from said circulatory system to said spring elements and the discharge of hydraulic pressure medium from the spring elements into said tank by way of said supply and return lines, respectively, including a connecting line and a plurality of further valve means, and transmission means adapted to be operated in dependence on the prevailing height of the vehicle body with respect to the corresponding wheel axle for actuating said further valve means, said control valve means including a control valve member supported in said housing so as to be freely movable in the axial direction thereof, a valve seat provided within said housing for said control valve member, the end face of said control valve member which is acted upon by the continuous oil stream of the circulatory system extending beyond said valve seat so that an annular zone of said first-mentioned end face remains exposed to the hydraulic pressure medium in said system also in the closed position of the control valve member, the connecting line, provided in said housing, terminating at the opposite end face of said control valve member, the said opposite end face of said control valve member having a larger area than said annular zone, said further valve means valving said connecting line with respect to the supply and return lines, and means operatively connecting said transmission means with said wheel suspension and said further valve means in such a manner that a normally closed first one of said further valve means is temporarily opened by said transmission means during the regulating condition calling for the supply of hydraulic pressure medium to the spring elements while the other two further valve means remain closed and that during the regulating condition calling for the discharge of hydraulic medium from the spring elements, the said other two further valve means which normally close the connecting line against the supply and return lines are temporarily opened while the first-mentioned further valve means remains closed, said annular zone being constructed of conical shape, said transmission means including a first transmission member and a push rod opening the first one o fsaid further valve means for the supply of pressure medium to the spring elements, said other further valve means being disposed one behind the other in the actuating direction thereof, and a second transmission member and push-rods provided on both sides of the further valve means closing the connecting line with respect to the return line for actuating both of the other further valve means substantially simultaneously by said second transmission member to thereby enable the discharge of pressure medium from said spring elements.

7. An automatic control mechanism for controlling the feed of hydraulic pressure medium to and the discharge thereof, especially from hydropneumatic spring elements to maintain substantially constant the height of a vehicle body with respect to the axles, comprising, within a housing provided with a plurality of ports, first channel means interconnecting a first one with a second one of said ports, control valve means in said first channel means and operable to temporarily block the flow of oil in said first channel means, second channel means operatively connecting said first channel means with a third port including therein pressure relief valve means automatically actuated by the presence in said first port of a predetermined pressure of a hydraulic medium upon actuation of said control valve means to produce the said temporary blocking, connecting line means operatively connecting said second channel means with a fourth port, said connecting line means being effectively in communication with said control valve means and including a plurality of further valve means normally closing said connecting line means with respect to said third and fourth ports, and alternately operable transmission means operatively connected with said further valve means for actuating said further valve means in such a manner that one of said further valve means establishing a communication between said connecting line means and said third port is opened upon displacement of said alternately operable transmission means in one direction while the other further valve means remain closed and that two others of said further valve means establishing a communication between said third and fourth ports are opened upon displacement of said transmission means in the opposite direction while said one further valve means remains closed, and a valve seat in said housing for receiving one end portion of said control valve means, said control valve means projecting with a rim zone thereof outwardly beyond said valve seat in the fully closed position of said control valve means and being exposed with said rim zone to the pressure medium in said first port, the opposite end of said control valve means facing said connecting line means and being of larger effective cross sectional area than said rim zone.

8. A mechanism according to claim 7, wherein said rim zone is of conical shape.

9. An automatic control mechanism for controlling the feed of hydraulic pressure medium to and the discharge thereof, especially from hydropneumatic spring elements to maintain substantially constant the height of a vehicle body with respect to the axles, comprising, within a housing provided with a plurality of ports, first channel means interconnecting a first one with a second one of said ports, control valve means in said first channel means and operable to temporarily block the flow of oil in said first channel means, second channel means operatively connecting said first channel means with a third port including therein pressure relief valve means automatically actuated by the presence in said first port of a predetermined pressure of a hydraulic medium upon actuation of said control valve means to produce the said temporary blocking, connecting line means operatively connecting said second channel means with a fourth port, said connecting line means being effectively in communication with said control valve means and including a plurality of further valve means normally closing said connecting line means with respect to said third and fourth ports, and alternately operable transmission means operatively connected with said further valve means for actuating said further valve means in such a manner that one of said further valve means establishing a communication between said connecting line means and said third port is opened upon displacement of said alternately operable transmission means in one direction while the other further valve means remain closed and that two others of said further valve means establishing a communication between said third and fourth ports are opened upon displacement of said transmission means in the opposite direction while said one further valve means remains closed, and a valve seat in said housing for receiving one end portion of said control valve means, said control valve means projecting with a rim zone thereof outwardly beyond said valve seat in the fully closed position of said control valve means and being exposed with said rim zone to the pressure medium in said first port, the opposite end of said control valve means facing said connecting line means and being of larger effective cross sectional area than said rim zone, said transmission means including a two-armed lever, a first transmission member connected to one arm of said two-armed lever and a first push rod actuated by said first transmission member for opening said one further valve means, said two further valve means being disposed one behind the other in the actuating direction thereof, a second transmission member connected to the other arm of said lever, and two further push-rods provided on both sides of one of said two further valve means for actuating both said two further valve means substantially simultaneously by said second transmission member.

10. An automatic control mechanism for controlling the feed of hydraulic pressure medium to and the discharge thereof, especially from hydropneumatic spring elements to maintain substantially constant the height of a vehicle body with respect to the axles, comprising, within a housing provided with a plurality of ports, first channel means interconnecting a first one with a second one of said ports, control valve means in said first channel means and operable to temporarily only block the flow of oil in said first channel means, second channel means operatively connecting said first channel means with a third port including therein pressure relief valve means in said first channel means ahead of said control valve means and automatically actuated by the presence in said first port of a predetermined pressure of a hydraulic medium upon actuation of said control valve means to produce the said temporary blocking, connecting line means operatively connecting said second channel means with a fourth port, said connecting line means being effectively in communication with said control valve means and including a plurality of further valve means normally closing said connecting line means with respect to said third and fourth ports, and alternately operable transmission means operatively connected with said further valve means for actuating said further valve means in such a manner that one of said further valve means establishing a communication between said connecting line means and said third port is opened upon displacement of said alternately operable transmission means in one direction while the other further valve means remain closed and that two others of said further valve means establishing a communication between said third and fourth ports are opened upon displacement of said transmission means in the opposite direction while said one further valve means remains closed, and a valve seat in said housing for receiving one end portion of said control valve means, said control valve means projecting with a rim zone thereof outwardly beyond said valve seat in the fully closed position of said control valve means and being exposed with said rim zone to the pressure medium present in said first port, the opposite end of said control valve means facing said connecting line means and being of larger effective cross sectional area than said rim zone.

11. A control system for automatically controlling the supply and discharge of a hydraulic medium to the hydraulically controlled springs, of a motor vehicle having a body, comprising a circulatory system for the hydraulic medium including pump means, tank means and line means interconnecting said pump and tank means in said circulatory system, control means operatively connected into said system and normally enabling circulation of the hydraulic medium, and further line means operatively connecting said control means with said springs, said control means including first means normally enabling said circulation in one position thereof and for temporarily blocking the circulation of the hydraulic medium in said system in a second position thereof, second means operable in dependence on the increase in pressure in the hydraulic medium for supplying additional hydraulic medium to said springs, third means operable to initiate actuation of said first means in dependence on a change of the vehicle body height relative to the road surface in one direction from a predetermined position thereof, said first means including a valve member capable of moving independently of the movements of said third means, fourth means operable to discharge hydraulic medium from said springs in dependence on a change of the vehicle body height relative to the road surface in the opposite direction from said predetermined position thereof, and fifth means operatively associated with said first means for returning said first means relatively rapidly from said second to said one position near completion of the control operations by said control means for supplying the said additional hydraulic medium.

12. A control system according to claim 11, wherein said first means includes an adjustable valve means, and said fifth means includes a surface portion of said valve means exposed to the hydraulic medium with said first means in said second position.

13. A control system according to claim 12, wherein said third means includes means for applying the pressure of the hydraulic medium in the spring to a further surface portion of said valve means which is larger in area than said first-mentioned surface portion.

14. A control system according to claim 13, wherein said second means includes relief valve means actuated by the pressure in said system.

15. A control system according to claim 11, wherein said fifth means includes means for changing over said first means substantially instantaneously from said second to said first position.

16. A control system according to claim 15, wherein said first means includes differential piston means selectively subjected to the pressure of the hydraulic medium in said springs.

17. A control system according to claim 11, wherein said first means includes differential piston means forming said valve member which is exposed to the pressure of the hydraulic medium in said circulatory system and selectively subjected to the pressure of the hydraulic medium in said springs.

References Cited by the Examiner

UNITED STATES PATENTS

| | | |
|---|---|---|
| 2,644,699 | 7/1953 | Weiertz. |
| 2,818,273 | 12/1957 | Weihsmann _____ 280—124 |
| 2,915,307 | 12/1959 | Heiss. |
| 2,957,702 | 10/1960 | Heiss. |
| 3,087,743 | 4/1963 | Behles _____ 280—124 |

BENJAMIN HERSH, *Primary Examiner.*

A. HARRY LEVY, *Examiner.*